(12) United States Patent
Blom et al.

(10) Patent No.: US 10,137,992 B2
(45) Date of Patent: Nov. 27, 2018

(54) REMOTE CONTROLLED AIR NOZZLES AND METHODS OF ASSEMBLING THE SAME

(71) Applicant: The Boeing Company, Seal Beach, CA (US)

(72) Inventors: Adriana Willempje Blom, Shoreline, WA (US); Christopher H. Abada, Seattle, WA (US); Frederick T. Calkins, Renton, WA (US); Yakentim M. Ibrahim, Brier, WA (US); Paula Jo Boppre, Everett, WA (US); Michael K. Klein, Bothell, WA (US); James Henry Mabe, Seattle, WA (US)

(73) Assignee: The Boeing Company, Chicago, IL (US)

( * ) Notice: Subject to any disclaimer, the term of this patent is extended or adjusted under 35 U.S.C. 154(b) by 821 days.

(21) Appl. No.: 14/166,249

(22) Filed: Jan. 28, 2014

(65) Prior Publication Data

US 2015/0210397 A1 Jul. 30, 2015

(51) Int. Cl.
*B64D 13/00* (2006.01)
(52) U.S. Cl.
CPC ........ *B64D 13/00* (2013.01); *B64D 2013/003* (2013.01); *Y10T 29/49826* (2015.01)
(58) Field of Classification Search
CPC ................................ B64D 13/00; B64D 13/06
USPC ...................................................... 454/76, 71
See application file for complete search history.

(56) References Cited

U.S. PATENT DOCUMENTS

| | | | | |
|---|---|---|---|---|
| 5,328,152 A * | 7/1994 | Castle | ............ | B60H 1/3442 251/229 |
| 5,399,119 A * | 3/1995 | Birk | ............ | B60H 1/3442 454/286 |
| 6,719,623 B1 * | 4/2004 | Kodaveridan | ......... | B64D 13/00 454/154 |
| 7,014,557 B2 | 3/2006 | Thomassin et al. | | |
| 7,464,548 B2 | 12/2008 | Yson et al. | | |
| 8,118,264 B2 | 2/2012 | Mabe et al. | | |
| 9,457,907 B2 * | 10/2016 | Brown | ............ | B64D 13/00 |
| 9,644,859 B2 * | 5/2017 | Migliore | ............ | F24F 13/065 |
| 2002/0119745 A1 * | 8/2002 | Thomassin | .......... | B60H 1/3442 454/76 |
| 2004/0029519 A1 * | 2/2004 | Pieper | ............ | B64D 13/00 454/76 |
| 2005/0064809 A1 * | 3/2005 | Thomassin | .......... | B60H 1/3442 454/76 |
| 2006/0116063 A1 * | 6/2006 | Seume | .......... | B60H 1/3442 454/76 |
| 2009/0163131 A1 | 6/2009 | Walkinshaw et al. | | |

(Continued)

*Primary Examiner* — Steven B McAllister
*Assistant Examiner* — Samantha Probst
(74) *Attorney, Agent, or Firm* — Armstrong Teasdale LLP

(57) ABSTRACT

An aircraft includes a plurality of seats and an input device coupled to each of the plurality of seats. The aircraft also includes a remotely controlled nozzle positioned proximate each seat of the plurality of seats. Each nozzle includes an actuator assembly including at least one actuator and an actuator shaft. The at least one actuator is configured to move the actuator shaft between an open position and a closed position to control an airflow through the nozzle in response to a signal received from a respective input device of the input devices, wherein the signal represents a position of the actuator shaft.

17 Claims, 14 Drawing Sheets

(56) References Cited

U.S. PATENT DOCUMENTS

| | | | | |
|---|---|---|---|---|
| 2010/0093267 A1* | 4/2010 | Hogh | ................... | B60H 1/34 |
| | | | | 454/76 |
| 2010/0112924 A1* | 5/2010 | Alexander | ............ | B60H 1/008 |
| | | | | 454/70 |
| 2013/0115868 A1* | 5/2013 | Davis | ................... | B64D 13/00 |
| | | | | 454/76 |
| 2013/0203332 A1 | 8/2013 | Fernandes et al. | | |
| 2015/0210397 A1* | 7/2015 | Blom | ................... | B64D 13/00 |
| | | | | 454/76 |

* cited by examiner

REMOTE CONTROLLED AIR NOZZLES AND METHODS OF ASSEMBLING THE SAME

BACKGROUND

The implementations described herein relate generally to nozzles and gasper type air nozzles, and, more specifically, to remotely-controlled air nozzles and methods of assembly thereof.

Interior climate control options are desirable to the passengers of enclosed vehicles, such as airplanes. However, a large interior area with a uniform room climate, such as an airplane fuselage cabin, is rarely simultaneously comfortable for all occupants. The varying comfort levels are accommodated by passenger adjustment of the direction and volume of air output by individual air venting nozzles, or gaspers. As used herein, the term "gasper" or "gasper nozzle" is meant to describe an airflow nozzle that may be found within an interior portion of a vehicle, such as, but not limited to, automobiles, trains, ships, aircraft, or any other type of conveyance. At least some known commercial aircraft present each passenger with an adjustable gasper nozzles that is mounted in an overhead compartment and which the passenger can manually manipulate to control the direction and volume of the airstream output by their respective gasper.

However, because gasper nozzles in aircraft are typically located in the overhead compartment above and forward of each seat, a passenger must reach forward and above their head to direct the gasper and also to adjust the volume of air passing through it. Therefore, children, passengers of shorter stature, elderly passengers, and those sitting near the aisle or with certain health issues may not be able to reach up to the gasper to manually manipulate it, and must get up from their seats to do so if they are able to at all. The passengers must also guess at the volume and direction settings because they are out of their seated position and are not able to feel the effect of these manipulations. The passenger often must repeat the adjustment process several times before reaching a satisfactory setting. This iterative process is uncomfortable for the passenger as well as the neighboring passengers.

Furthermore, such passengers may wish to adjust the gasper settings during a time in which they have been asked to refrain from standing, such as during takeoff or landing or during a period of turbulence in an aircraft. To adjust their gasper during such a time is not recommended, or they may call a flight attendant for assistance, which may pull the attendant away from more important duties they have to perform at the time.

BRIEF DESCRIPTION

In one aspect, an aircraft is provided. The aircraft includes a plurality of seats and an input device coupled to each of the plurality of seats. The aircraft also includes a remotely-controlled nozzle positioned proximate each seat of the plurality of seats. Each nozzle includes an actuator assembly including at least one actuator and an actuator shaft. The at least one actuator is configured to move the actuator shaft between an open position and a closed position to control an airflow through the nozzle in response to a signal received from a respective input device. The signal is representative of a position of the actuator shaft.

In another aspect, a remotely-controlled nozzle is provided. The nozzle includes a housing and an actuator assembly. The actuator assembly includes at least one actuator and an actuator shaft. The at least one actuator is configured to move the actuator shaft between an open position and a closed position within the housing to control the airflow through the nozzle in response to a signal received from a remote input device. The signal is representative of a position of the actuator shaft.

In yet another aspect, a method of assembling a remotely-controlled nozzle is provided. The method includes providing a housing and coupling an actuator assembly to the housing. Coupling the actuator assembly to the housing includes providing an actuator shaft and coupling at least one actuator to the actuator shaft such that the at least one actuator is configured to move the actuator shaft between an open position and a closed position within the housing in response to a signal received from a remote input device. The signal represents a position of the actuator shaft.

DETAILED DESCRIPTION

Figure 1:
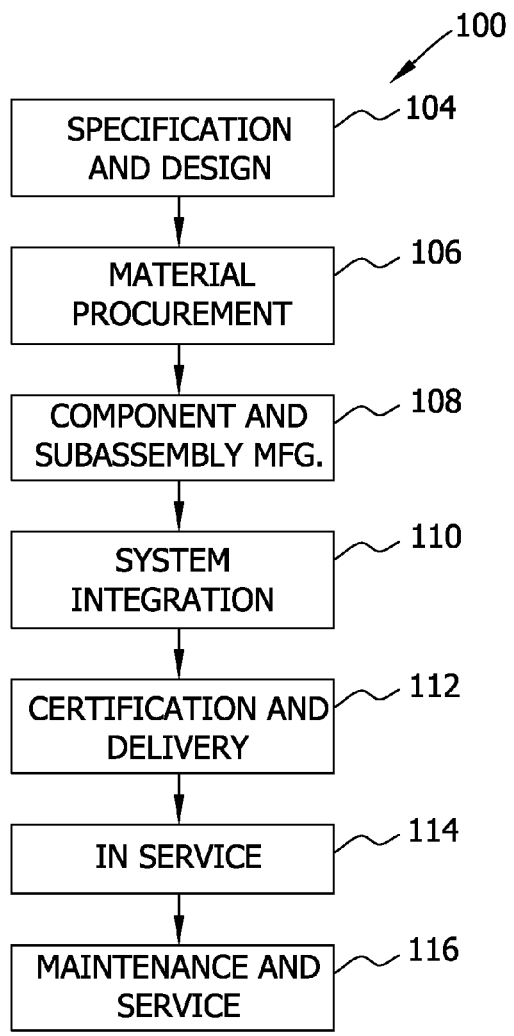
FIG. 1 is a flow diagram of an exemplary aircraft production and service methodology.
Figure 2:
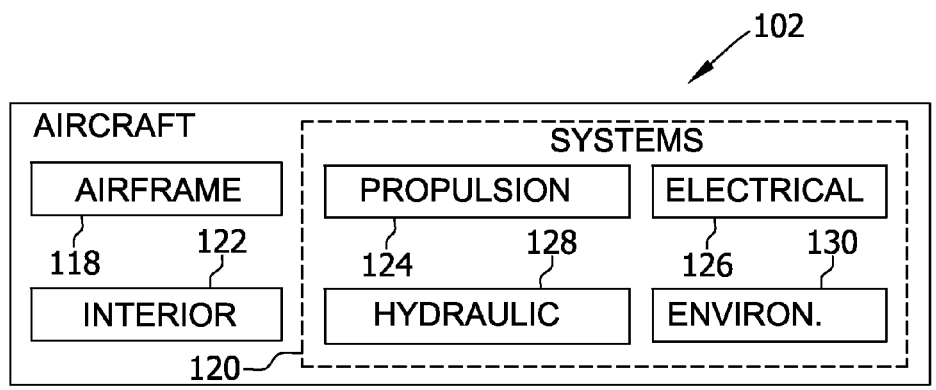
FIG. 2 is a block diagram of an exemplary aircraft.

Referring FIG. 1, implementations of the disclosure may be described in the context of an aircraft manufacturing and service method 100 and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation. Moreover, as used herein, the term "gasper" or "gasper nozzle" is meant to describe an airflow nozzle that may be found within an interior portion of a vehicle, such as, but not limited to, automobiles, trains, ships, aircraft, or any other type of conveyance.

Figure 3:
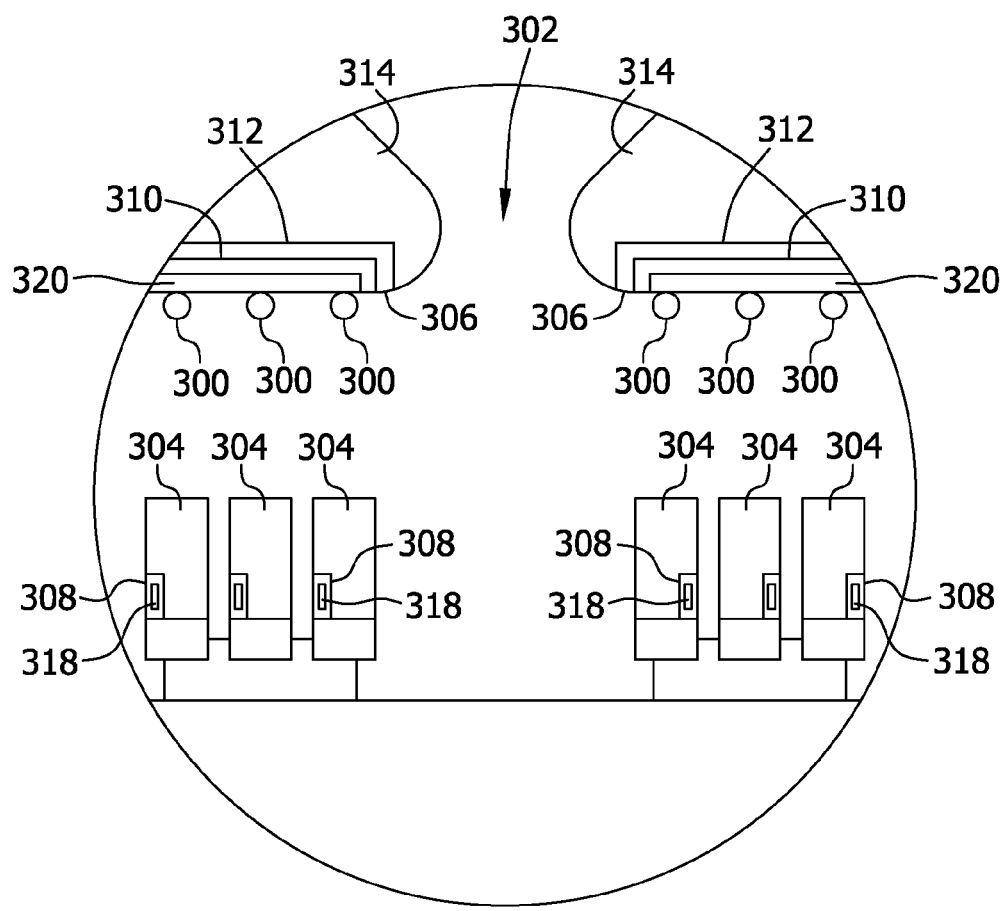
FIG. 3 is a schematic and perspective illustration of an exemplary remotely-controlled gasper nozzle positioned within a vehicle interior.

FIG. 3 is a schematic and perspective illustration of an exemplary remotely-controlled gasper nozzle 300 positioned within an interior portion 302 of a cabin compartment of a commercial jet passenger aircraft. FIGS. 4A-4C are schematic illustrations of various functional states of the exemplary gasper nozzle 300 shown in FIG. 1. Although the context of the discussion contained herein is with respect to a commercial jet passenger aircraft, it should be understood that the teachings of the present disclosure are compatible with all types of aircraft including, but not limited to, private propeller driven aircraft, private jets, commercial propeller driven passenger aircraft, cargo aircraft, military aircraft, and the like. Furthermore, although gasper nozzle 300 disclosed herein is described as being compatible for use on board an aircraft, it should be understood that gasper nozzle 300 is compatible with all types of vehicles. For example, and without limitation, gasper nozzle 300 may be implemented on board automobiles, buses, trains, ships, spacecraft, and any other type of conveyance. Additionally, gasper nozzle 300 is not limited to implementation on vehicles, but may also be compatible for use in tents, houses, buildings, stadiums, theaters, and other permanent and/or semi-permanent structures.

In the exemplary implementation, a plurality of remotely-controlled gasper nozzles 300 is positioned within interior 302 of a vehicle, such as within interior 122 of aircraft 102 (both shown in FIG. 2). Gasper nozzles 300 are located proximate a seat 304 of a plurality of seats on a surface 306. In some implementations in which vehicle interior 302 is that of an aircraft, surface 306 corresponds to the underside of the overhead baggage compartments. Gasper nozzles 300 provide selectively variable airflow to users of the vehicle located in seats 304. More particularly, according to the principles of the present disclosure, gasper nozzles 300 integrate airflow direction and volume control from each respective gasper nozzle 300 at the point of use of each respective gasper nozzle 300 or from the passenger's seat 304 in vehicle interior 302. As such, according to the principles of the present disclosure, users of the vehicle, such as passengers of an aircraft, can adjust both the rate and the direction of the airflow from respective gasper nozzles, according to their respective individual preferences. Furthermore, each gasper nozzle 300 may be remotely-controlled from a central location, such as a flight attendant control panel. The ability to control each nozzle 300 from a single location enables aircraft crew to modify the temperature of the cabin without having to manually adjust the control settings for each nozzle 300.

In the exemplary implementation, nozzle 300 is positioned directly above a corresponding passenger seat 304. Each seat 304 includes an input device 308 configured to communicate with gasper nozzle 300 corresponding to seat 304. For example, input device 308 is coupled in communication with a control board 310 located on a service panel 312 within a passenger service unit (PSU) 314. Input device 308 is configured to control the position of the corresponding gasper nozzle 300. For example, input device 308 may transmit a signal 316 to control the position of gasper nozzle 300 corresponding to seat 304.

As illustrated in FIG. 4A, gasper nozzle 300 is initially in a closed position such that no air flows from nozzle 300. As illustrated in FIG. 4B, in response to an air flow control signal 316 transmitted from input device 308, gasper nozzle 300 is actuated to the open position to allow a maximum amount of air (denoted by arrows) to flow towards seat 304. As illustrated in FIG. 4C, gasper nozzle 300 is actuated such that the amount of air flow from gasper nozzle 300 is restricted (denoted by smaller arrows) by actuating nozzle 300 towards the closed position. Furthermore, a passenger display (not shown) may be coupled to at least one of seat 308 and/or input device 308 to provide visual indication to the passenger of the current position of gasper nozzle 300.

The various signals transmitted to control board 310 from input device 308 may be wired or wireless signals. In a wired implementation, electrical connections may be routed from input device 308 of each seat 304 through the body of the cabin and to control board 310 of PSU 314. In a wireless implementation, input device 308 includes a wireless transmitter 318 configured to transmit a wireless signal 316 (e.g., radio frequency, Bluetooth, infrared). Control board 310 includes a wireless receiver 320 configured to receive wireless signal 316 transmitted by input device 308. Control board 310 may also include a processing module (not shown) configured to process wireless signal 316 and provide a control signal (not shown) to open/close gasper nozzle 300. Alternatively, gasper nozzle 300 is capable of passenger manual over-ride control instead of remotely-controlled using input device 308.

Figure 4:
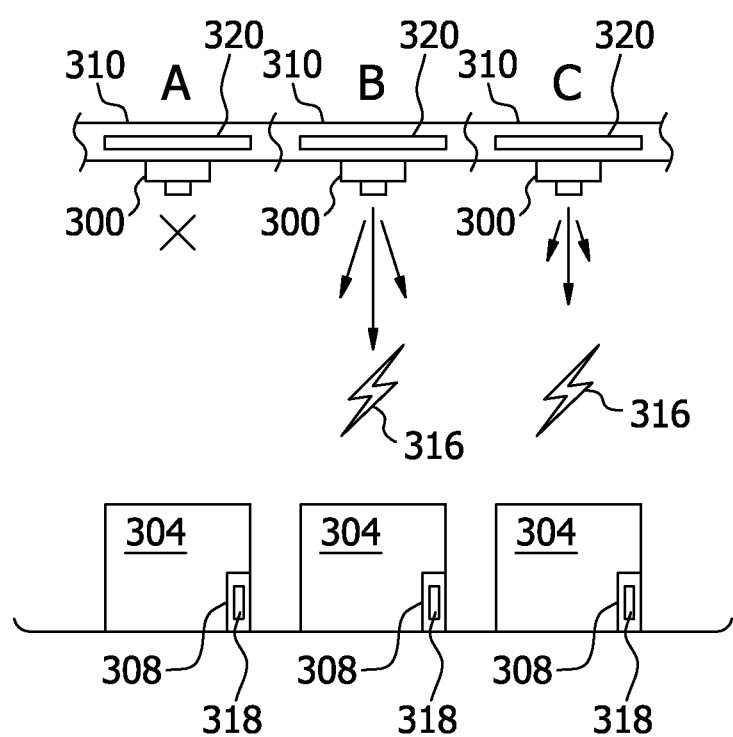
FIGS. 4A-4C are schematic illustrations of various functional states of the exemplary gasper nozzle shown in FIG. 1.

In the exemplary implementation, gasper nozzle 300 includes at least one actuator (not shown in FIG. 3 or 4) configured to actuate gasper nozzle 300 between the closed position shown in FIG. 4A and the open position shown in FIG. 4C. The actuator is selected from the group consisting of an electrical motor actuator, a shape memory alloy (SMA) actuator, an electromagnetic actuator, a piezoelectric actuator, a bi-metallic actuator, or any combination thereof. In the exemplary implementation, each actuator is a wire formed from an SMA material. For example, the SMA may be made from copper-aluminum-nickel or nickel-titanium alloys by alloying zinc, copper, gold and iron. An SMA is an alloy that exhibits a thermoelastic martensite transformation, such that it can be deformed while in the martensite phase and the deformation is recovered when the SMA returns to the austenite phase. An SMA is sensitive to temperature or heat. Such heating may be accomplished through resistive heating (e.g., by passing an electrical current through the SMA part) or through conductive or convective heating using a separate heating element. For example, the SMA material may temporarily undergo a dimensional change, such as a change in length at a certain temperature. For example the SMA material may contract (e.g., shorten) at a temperature that is above the ambient temperature for the SMA material, and expand at a relatively lower temperature to return to its original condition (e.g., original length). In this way, the wire actuator made of the SMA material, may undergo a change in length and a return toward its original length one or more times via temperature treatment or repeated temperature cycling. Alternatively, the opposite may true such that SMA material may expand at a temperature that is above the ambient temperature for the SMA material, and contract at a relatively lower temperature to return to its original condition (e.g., original length).

In the process of undergoing a dimensional change, as described above, the SMA material may go through a reversible phase transition or transformation, or a reversible structural phase transition, upon a change in temperature. The SMAs may have a low temperature phase, or martensitic phase, and a high temperature phase, or austenitic phase. The particular phase transition associated with a particular SMA material may vary.

Figure 5:
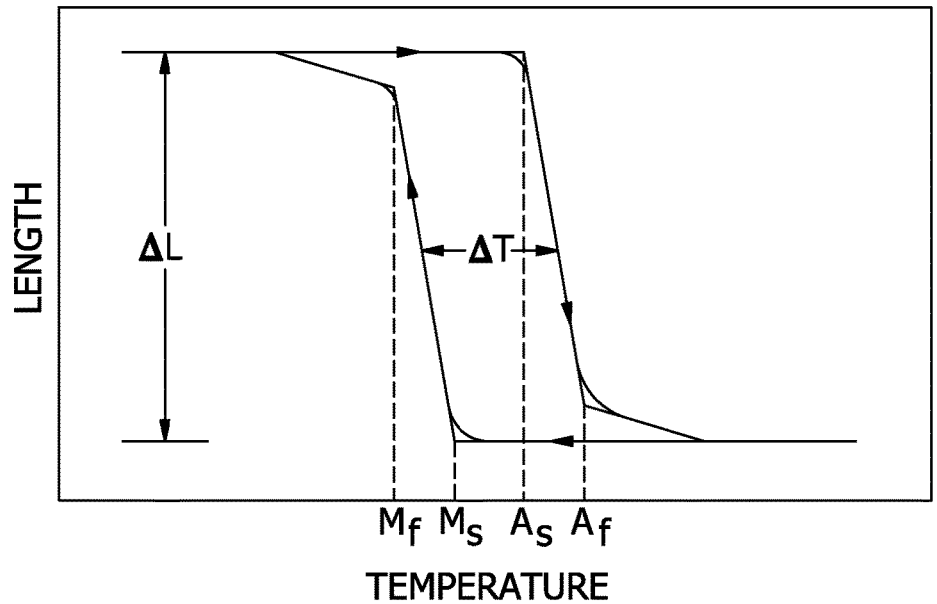
FIG. 5 is a length versus temperature graph for a typical shape memory alloy element that may be used in the exemplary gasper nozzle shown in FIG. 1.
Figure 6:
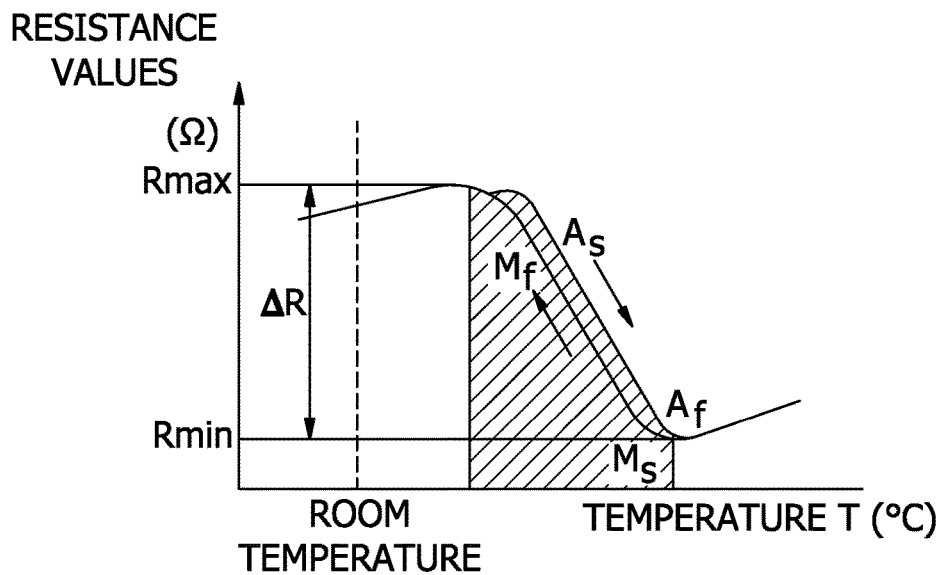
FIG. 6 is a resistance versus temperature graph for a typical shape memory alloy element that may be used in the exemplary gasper nozzle shown in FIG. 1.

The transition from the martensite (low temperature) phase to the austenite (high temperature) phase in SMAs does not happen instantaneously at a specific temperature but rather progresses incrementally over a temperature range. FIG. 5 shows the relationship between displacement and temperature, indicating the austenite start ($A_s$) and austenite finish ($A_f$) temperatures, as well as the martensite start ($M_s$) and martensite finish ($M_f$) temperatures. In the temperature range indicated by $\Delta T$, the SMA consists of a mixture of austenite and martensite. As can be seen, substantially no change in length occurs below $A_s$, and substantially no further change in length occurs above $A_f$ as the SMA is heated. Similarly, on cooling substantially no change in length occurs above $M_s$, and substantially no further change in length occurs below $M_f$. There is a relationship between the electrical resistance of an SMA part and its temperature, as is shown in FIG. 6, which is shown for an SMA having an $M_f$ above room temperature. As can be seen, within the shaded region between $R_{min}$ and $R_{max}$, the resistance can be used as an analog for the SMA temperature and hence it is possible to deduce the percentage transformation between the two phases based entirely on the resistance value with no direct measurement of temperature.

SMAs suitable for room temperature applications may be those that have an austenite-martensite transition range somewhat above an expected ambient temperature, such as a martensite finish temperature of about 30-50° C. Within such a range the SMA will remain in its martensite phase in the absence of applied heating, and the SMA will have an austenite finish temperature that is low enough, such as about 80-100° C., to be compatible with common engineering plastics to minimize the amount of heating (e.g., electrical energy input to the SMA) required to complete the martensite-to-austenite transition. SMAs with other transition temperature ranges may be chosen for actuators designed to operate at decreased (e.g., below 0° C.) or elevated (e.g., above 100° C.) temperature environments. Generally, the transition temperature of an SMA is highly sensitive to the composition of the alloy and can be selected by slightly varying the constituent ratios.

Applying these principles, SMA materials are utilized in constructing devices that do work when heated to transform from martensitic to austenitic phases. SMA materials are typically slower acting than such devices as electromechanical motors and hydraulic and pneumatic actuators, but SMA materials are highly reliable, generally require relatively few parts, and are weight efficient when compared to motors and the like. An object such as a wire formed of an SMA can be trained, for example, to shorten when heated. Such a wire can pull a load to do work. The wire can be heated by resistive heating produced by passing an electrical current through the wire. Thus a current-actuated linear actuator can be constructed of less parts than a conventional electrical motor linear actuator.

It should be noted that SMA wire as used in the disclosure may refer to SMA material of elongate form, capable of contraction/elongation along a longitudinal axis. Thus, the term wire does not imply a circular cross-section, although that may be the typical cross-section, but includes cross-sections that may be elliptical, square, rectangular, or the like.

Although SMA actuators have proven useful in a wide variety of contexts, including aircraft-related contexts, to actuate particular devices, it is contemplated that any material that expands by going through a phase transition at a certain temperature and shrinks at a different temperature to return toward its original condition may also be used as the actuators in gasper nozzle 300.

Figure 7:
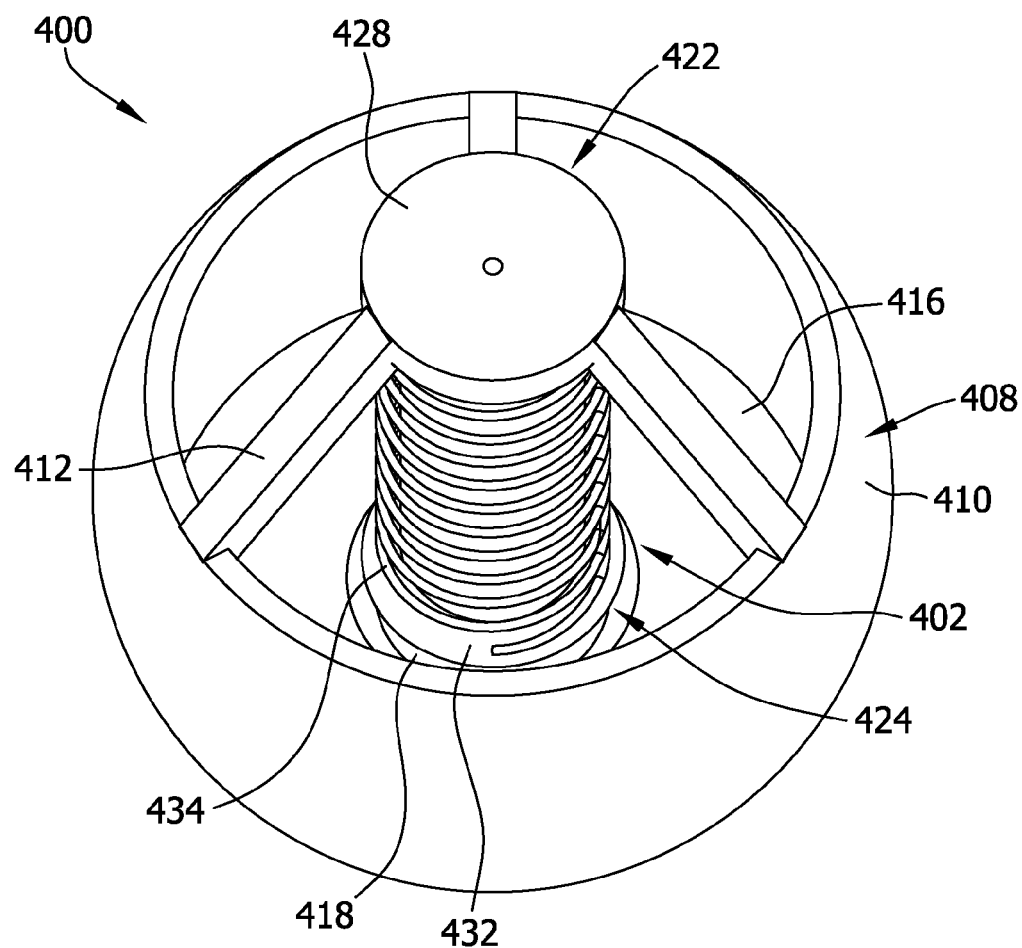
FIG. 7 is a perspective view of an exemplary implementation of the gasper nozzle shown in FIG. 1.
Figure 8:
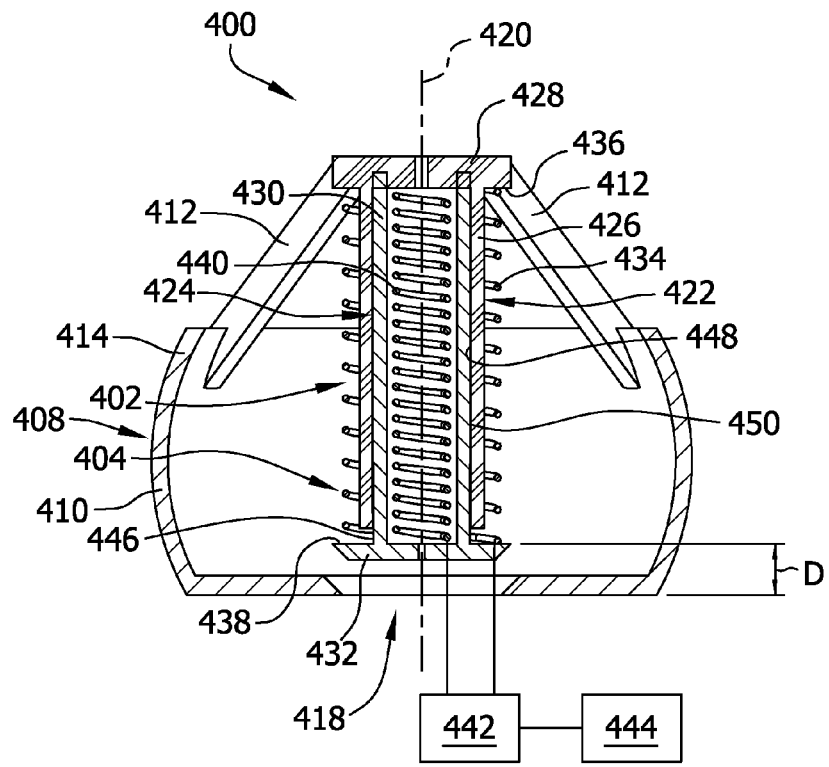
FIG. 8 is a cross sectional view of the gasper nozzle shown in FIG. 7 in an open position.
Figure 9:
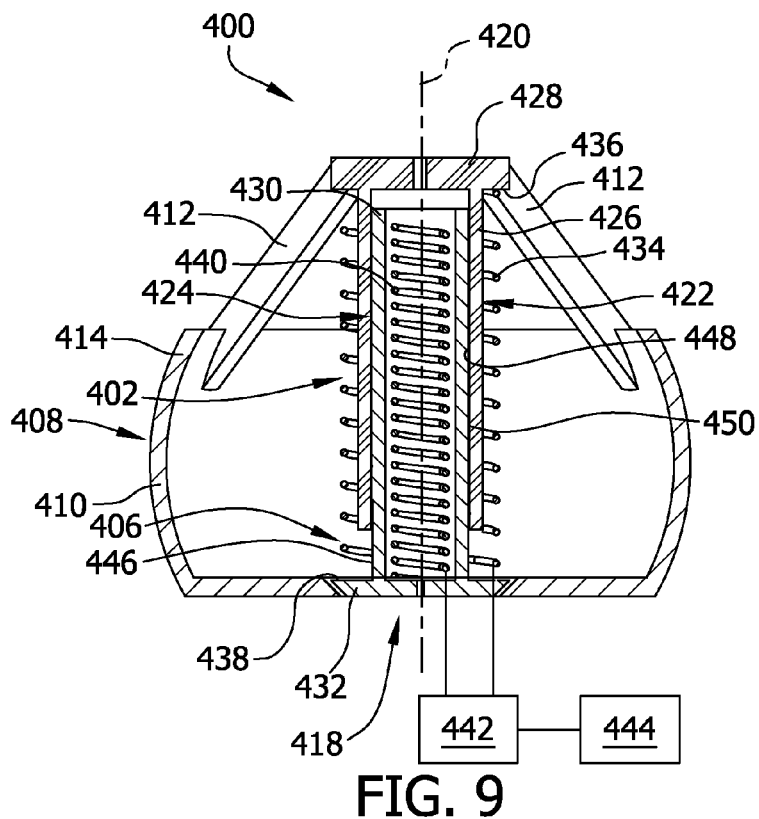
FIG. 9 is a cross sectional view of the gasper nozzle shown in FIG. 7 in a closed position.

FIG. 7 is a perspective view of an exemplary implementation of a remotely-controlled gasper nozzle 400 having a concentric actuator assembly 402. FIG. 8 is a cross sectional view of gasper nozzle 400 with concentric actuator assembly 402 shown in a telescopically extended, open position 404. FIG. 9 is a cross sectional view of gasper nozzle 400 with concentric actuator assembly 402 shown in a telescopically collapsed, closed position 406. In the exemplary implementation, nozzle 400 includes a housing 408 that includes a ball portion 410 and a plurality of legs 412 circumferentially spaced about a top portion 414 of ball portion 410. Ball portion 410 also includes a bottom plate 416 that includes a nozzle outlet 418 that at least partially defined a longitudinal axis 420 of gasper nozzle 400. Legs 412 extend at an oblique angle with respect to longitudinal axis 420 between top portion 414 and concentric actuator assembly 402 such that assembly 402 is positioned above outlet 418 and aligned with axis 420 to enable telescopic actuation between positions 404 and 406.

In the exemplary implementation, concentric actuator assembly 402 includes an outer sleeve 422 and a concentric inner sleeve 424 that are each aligned with longitudinal axis 420 and with outlet 418. Outer sleeve 422 is configured to remain stationary as inner sleeve 424 slides between the open and closed positions 404 and 406. Outer sleeve 422 includes an outer tube portion 426 and a substantially circular cap portion 428. Inner sleeve 424 includes an inner tube portion 430 that defines a diameter smaller than a diameter of outer tube portion 426. Cap portion 428 is concentric with tube portions 426 and 430 and includes a diameter that is larger than both diameters of tube portions 426 and 430 such that cap portion 428 extends beyond an outer surface (not shown) of tube portion 426. Further, cap portion 428 is coupled to ball portion 410 of housing 408 via obliquely extending legs 412. Inner sleeve 424 includes a plunger 432 coupled at a bottom end of inner tube portion 430 proximate outlet 418. Plunger 432 includes a diameter that is substantially similar to cap portion 428. In the exemplary implementation, plunger 432 includes a tapered shape that is complementary to the tapered shape of outlet 418 such that plunger 432 restricts airflow through outlet 418 in the closed position 406. Alternatively, plunger 432 may have any shape that facilitates operation of gasper nozzle 400 as described herein.

In the exemplary implementation, outer sleeve 422 includes an outer actuator 434 that is wound about an outer surface of outer tube portion 426. Outer actuator 434 is coupled to both outer and inner sleeve 422 and 424, and, more specifically, extends between a lower surface 436 of cap portion 428 and an upper surface 438 of plunger 432. Similarly, inner sleeve 424 includes an inner actuator 440 coupled between lower surface 436 and upper surface 438 within inner tube 430. In the exemplary implementation, outer and inner actuators 434 and 440 are configured to bias actuator assembly 402 to facilitate alternately restricting or allowing airflow through gasper nozzle 400. More specifically, outer and inner actuators 434 and 440 are configured to bias actuator assembly 402 between the open position 404 and the closed position 406 to control airflow through outlet 418.

Outer and inner actuators 434 and 440 include in their constructions one or more shape memory alloys (SMAs) such that each actuator 434 and 440 changes in length when thermally actuated. Actuator assembly 402 is shown telescopically collapsed in FIG. 8 and telescopically extended in FIG. 9. Actuators 434 and 440 are thermally actuated from the open position 404 of FIG. 8 to the closed position 406 of FIG. 9 by changing the temperatures of inner and outer actuators 434 and 440. Thermal actuation as used herein refers to dimensional changes invoked by temperature changes. The actuators described herein generally exhibit a work stroke when heated, taking advantage of the tendencies of trained SMA materials to forcibly assume austenitic states when heated above their transition temperatures. The actuators described herein generally exhibit self-resetting benefits, taking advantage of the tendencies of two-way trained SMA materials to intrinsically return to martensitic states when cooled. Thermal actuation as used herein relates equally to heating and cooling an SMA material across its transition temperature to invoke a transformation between martensitic and austenitic states. Thus thermal actuation can entail a work stroke actuation caused by an increase in temperature and a device reset actuation caused by a decrease in temperature.

In the exemplary implementation, actuators 434 and 440 are SMA wire coils. The length of contraction of actuator assembly 402 is related to the overall length of the SMA wire. Thus, use of coiled SMA wire actuators 434 and 440 increases the stroke delivered by actuator assembly 402. In order to compensate for any decrease in the available force, the thickness of the SMA wire may be increased. Alternatively, inner actuator 440 may be a substantially straight SMA wire extending between plunger 432 and cap portion 428 that stretches when actuator 434 expands and shortens in length when heated in the open position 404. Furthermore, actuators 434 and 440 may be either bare SMA wires, or they may be insulated SMA wires.

Gasper nozzle 400 also includes a current generating circuit 442 that includes an electric power source 444. Outer and inner actuators 434 and 440 are coupled to circuit 442 such that pulses of electricity from power source 444 are applied to actuators 434 and 440 in response to actuation signals 316 from input device 308 (both shown in FIG. 4). In the exemplary implementation, current generating circuit 442 is positioned on control board 310 (shown in FIG. 3). Alternatively, circuit 442 may be integrated within housing 408 electrically coupled to control board 310. Circuit 442 is configured to thermally actuate actuator assembly 402 by applying current to one of actuator 434 or 440 at a time to heat actuator 434 or 440 above a respective transition temperature so that austenitic states are assumed. This represents a work stroke of actuator assembly 402. Actuator assembly 402 may then be allowed to intrinsically reset by deactivating circuit 442 and allowing the heated actuator 434 or 440 to cool to ambient temperatures. Circuit 442 only heats one actuator 434 or 440 at a time since simultaneous heating would cause actuators 434 and 440 to counteract each other and may also overheat the SMA wire.

In the exemplary implementation, outer actuator 434 is sufficiently dimensioned such that when actuator 434 is heated (e.g., a current is applied by circuit 442) upon a first signal from input device 308 so as to induce a phase transition and an associated change in length, actuator 434 transforms from its martensitic state to its austenitic state to bias actuator assembly 402 toward the closed position 406. More specifically, actuator 434 functions as a compression spring such that when heated, actuator 434 elongates to push against upper surface 438 of plunger 432 toward outlet 418 to restrict airflow through gasper nozzle 400. As such, an outer surface 446 of inner tube portion 430 slides along an inner surface 448 of outer tube portion 426 to position plunger 432 substantially within outlet 418 in the closed position 406 to prevent airflow from gasper nozzle 400.

Similarly, inner actuator 440 is dimensioned such that when actuator 440 is heated by circuit 442 upon a second signal from input device 308, actuator 440 transforms from its martensitic state to its austenitic state to bias actuator assembly 402 toward the open position 404. More specifically, actuator 440 functions as a tension spring such that when heated, actuator 440 shortens in length to pull plunger 432 away from outlet 418 to enable airflow through gasper nozzle 400. As such, outer surface 446 of inner tube portion 430 slides along inner surface 448 of outer tube portion 426 to position plunger 432 a distance D from outlet 418 in the open position 404 to facilitate airflow from gasper nozzle 400. It should be understood that the actuation distance may be anywhere between the open position 404 and the closed position 406 based on a desired user comfort level as input into input device 308. It should also be understood that each actuator 434 and 440 could be oppositely trained and that actuator assembly 402 may telescopically extend to the closed position 406 when inner actuator 440 is heated and telescopically collapse to the open position 404 when outer actuator 434 is heated.

When outer and inner actuators 434 and 440 reach their austenitic states, circuit 442 terminates current flow and actuators 434 and 440 are intrinsically cooled to return to their martensitic states. However, actuator assembly 402 includes a detent 450 proximate inner tube outer surface 446 and outer tube inner surface 448 that is configured to retain actuator assembly 402 in the desired actuated position. In the exemplary implementation, detent 450 is a grooved or ridged surface pattern on outer tube inner surface 448. Alternatively, detent 450 may be a grooved or ridged surface pattern on inner tube outer surface 446. Furthermore, detent 450 may be a rubber ring positioned between surfaces 446 and 448. Generally, detent 450 may be any mechanism that provides enough resistance to movement through friction that when one of actuators 434 or 440 is intrinsically returning to its martensitic state after circuit 442 has stopped delivering current, actuator assembly 402 remains in its actuated position as desired by the user. Detent 450 creates enough friction such that actuator assembly 402 remains in its actuated position when current is terminated and actuators begin to cool to their martensitic states. Furthermore, detent 450 generates enough friction to counteract the pressure forces acting on plunger 432 by the air flowing through nozzle 400. However, detent 450 does not create so much friction that actuators 434 and 440 are prevented from subsequently moving actuator assembly 402. That is, detent 450 does not create an amount of friction that cannot be overcome by actuators 434 and 440.

Figure 10:
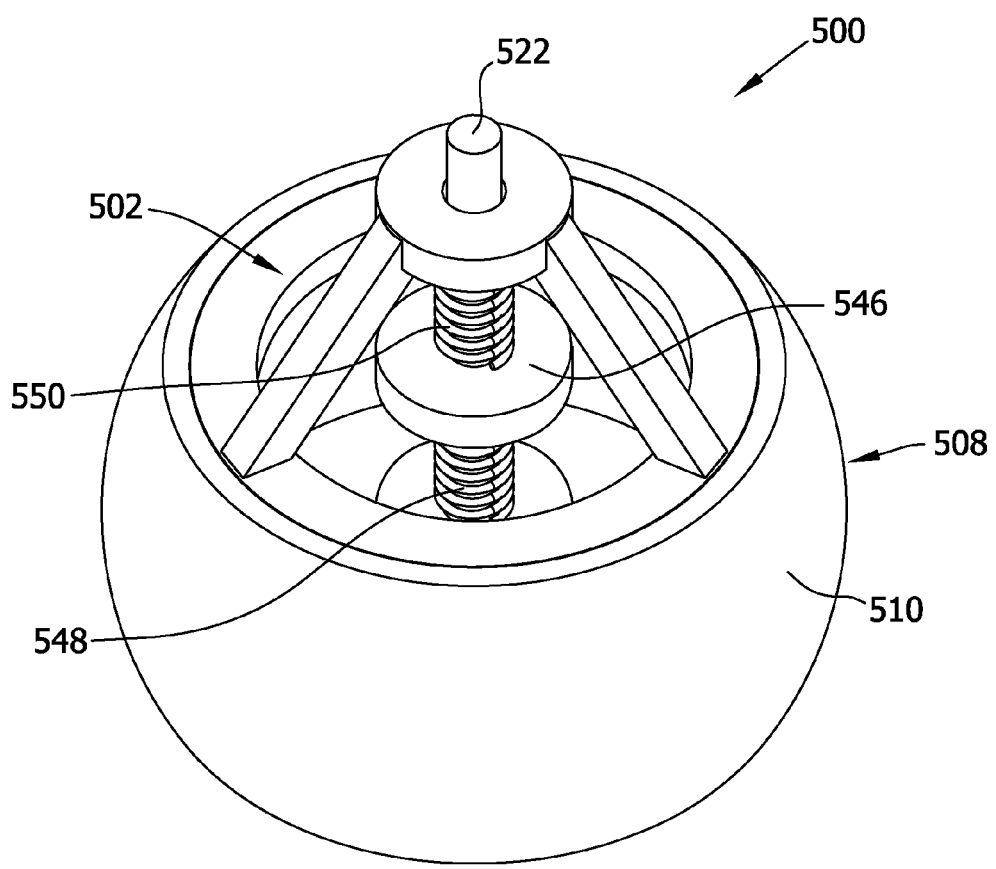
FIG. 10 is a perspective view of an alternative implementation of the gasper nozzle shown in FIG. 1.
Figure 11:
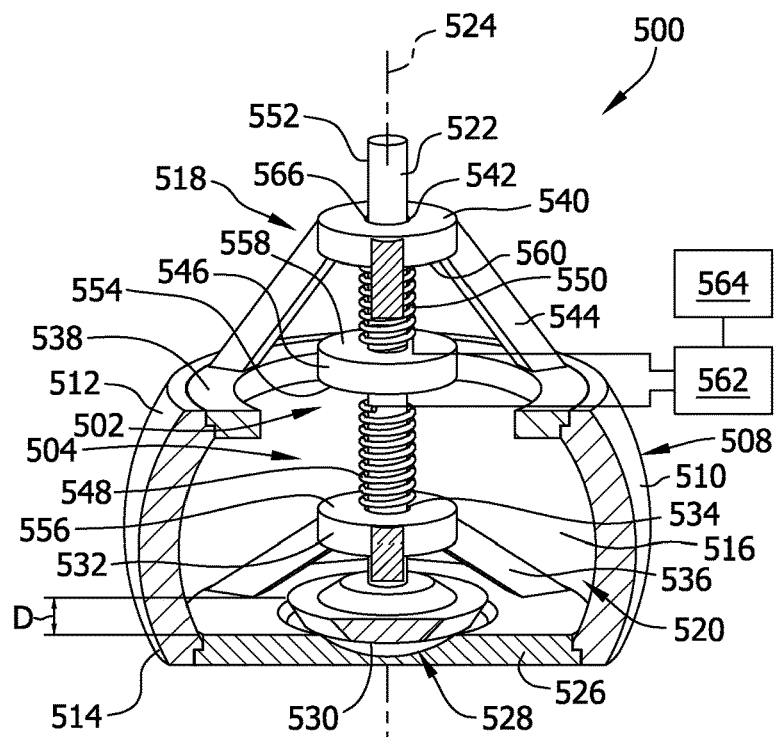
FIG. 11 is a cross sectional view of the gasper nozzle shown in FIG. 10 in an open position.
Figure 12:
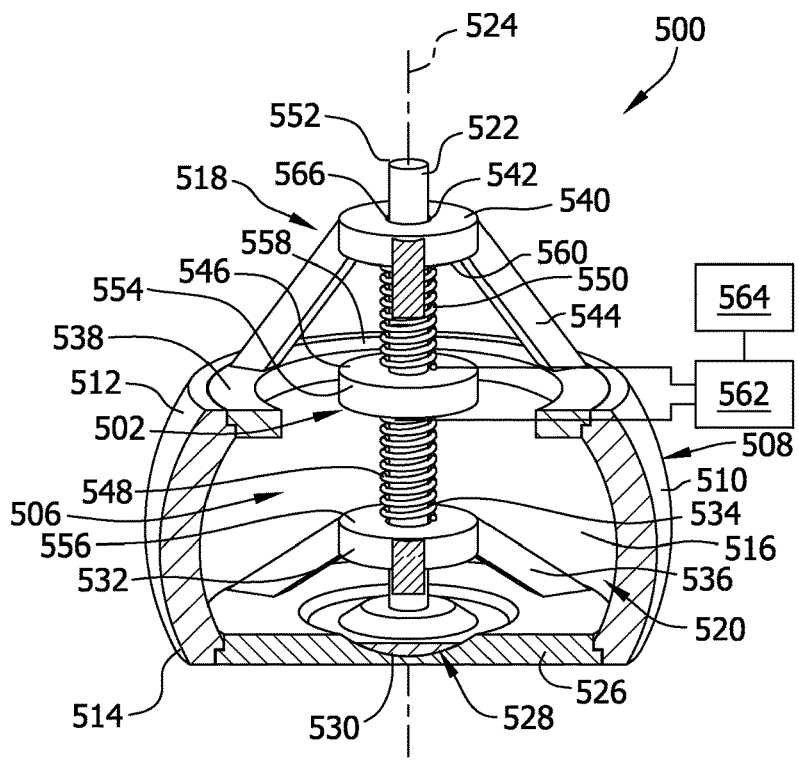
FIG. 12 is a cross sectional view of the gasper nozzle shown in FIG. 10 in a closed position.

FIG. 10 is a perspective view of another implementation of a remotely-controlled gasper nozzle 500 having a collinear actuator assembly 502. FIG. 11 is a cross sectional view of gasper nozzle 500 shown in an open position 504. FIG. 12 is a cross sectional view of gasper nozzle 500 with collinear actuator assembly 502 shown in a closed position 506. In the exemplary implementation, nozzle 500 includes a housing 508 that includes a substantially hollow ball portion 510 having an upper portion 512, a lower portion 514, and an interior cavity 516 extending therebetween. In the present implementation, actuator assembly 502 of nozzle 500 includes an upper mounting assembly 518 positioned proximate ball upper portion 512, a lower mounting assembly 520 positioned proximate ball lower portion 514, and an actuator shaft 522 extending between upper and lower mounting assemblies 518 and 520. Shaft 522 extends along an actuator axis 524 of gasper nozzle 500.

Lower mounting assembly 520 includes an outlet plate 526 coupled at lower portion 514 of ball portion 510. Outlet plate 526 defines a nozzle outlet 528 that is substantially concentric with axis 524. A plunger 530 is coupled to a lower end of shaft 522 proximate outlet 528. Shaft 522 is configured to be moveable between the open position 504 where plunger 530 is positioned a distance D from outlet 528 to allow airflow through gasper nozzle 500, and the closed position 506 where plunger 530 is positioned substantially within outlet 528 to restrict airflow through nozzle 500. Lower mounting assembly 520 also includes a lower mounting ring 532 positioned within cavity 516. Lower mounting ring 532 includes an opening 534 configured to receive at least a portion of actuator shaft 522 therethrough. A plurality of lower legs 536 extend obliquely between outlet plate 526 and lower mounting ring 532 such that lower mounting assembly 520 includes a substantially frusto-conical shape.

Similarly, upper mounting assembly 518 includes a coupling ring 538 coupled at upper portion 512 of ball portion 510. Coupling ring 538 is also substantially concentric with axis 524. Upper mounting assembly 518 also includes an upper mounting ring 540 that includes an opening 542 configured to receive at least a portion of actuator shaft 522 therethrough. Lower and upper mounting rings 532 and 540 are substantially similar in size and function in that openings 534 and 542 are configured to slidably engage shaft 522 to guide shaft 522 as it moves along axis 524. A plurality of upper legs 544 extend obliquely between coupling ring 538 and upper mounting ring 540 such that upper mounting assembly 518 also includes a substantially frusto-conical shape. Shaft 522 also includes a platform 546 positioned between lower and upper mounting rings 532 and 540. Platform 546 may either be coupled to shaft 522 or formed integrally thereto such that as shaft 522 moves along axis 524 between the open and closed positions 504 and 506, platform 546 moves along therewith.

In this implementation, collinear actuator assembly 502 further includes a lower actuator 548 and an upper actuator 550 that are both wound about an outer surface 552 of shaft 522. Lower actuator 548 is positioned within lower mounting assembly 520 and extends between a lower surface 554 of platform 546 and an upper surface 556 of lower mounting ring 532. Similarly, upper actuator 550 is positioned within upper mounting assembly 518 and extends between an upper surface 558 of platform 546 and a lower surface 560 of upper mounting ring 540. In this implementation, lower and upper actuators 548 and 550 are configured to bias at least a portion of actuator assembly 502 to facilitate alternately restricting or allowing airflow through gasper nozzle 500. More specifically, lower and upper actuators 548 and 550 are configured to bias shaft 522 of actuator assembly 502 between the open position 504 and the closed position 506 to control airflow through outlet 528.

Lower and upper actuators 548 and 550 include in their constructions one or more shape memory alloys (SMAs) such that each actuator 548 and 550 changes in length when thermally actuated. Actuator 548 is thermally actuated to position actuator assembly 502 in the open position of FIG. 8, and actuator 550 separately thermally actuated to position actuator assembly 502 in the closed position 506 of FIG. 9. Actuators 548 and 550 are actuated by changing the temperatures of lower and upper actuators 548 and 550, similar to outer and inner actuators 434 and 440 of gasper nozzle 400 (all shown in FIGS. 7-9). In the exemplary implementation, actuators 548 and 550 are SMA wire coils. The length of withdrawal D of actuator assembly 502 is related to the overall length of the SMA wires. Thus, use of coiled SMA wire actuators 548 and 550 increases the stroke delivered by actuator assembly 502. In order to compensate for any decrease in the available force, the thickness of the SMA wires may be increased.

In this embodiment, gasper nozzle 500 also includes a current generating circuit 562 that includes an electric power source 564. Lower and upper actuators 548 and 550 are coupled to circuit 562 such that pulses of electricity from power source 564 are applied to actuators 548 and 550 in response to actuation signals 316 from input device 308 (both shown in FIG. 4). As described above, current generating circuit 562 may be positioned either on control board 310 (shown in FIG. 3), or may be integrated within housing 508 and electrically coupled to control board 310. Circuit 562 is configured to thermally actuate actuator assembly 502 by applying current to at least one of actuator 548 and/or 550 to heat actuators 548 and 550 above a respective transition temperature so that austenitic states are assumed. This represents a work stroke of actuator assembly 502. Actuator assembly 502 may then be allowed to intrinsically reset by deactivating circuit 562 and allowing actuators 548 and/or 550 to cool to ambient temperatures.

In the exemplary implementation, upper actuator 550 is sufficiently dimensioned such that when actuator 550 is heated (e.g., a current is applied by circuit 562) upon a first signal from input device 308 so as to induce a phase transition and an associated change in length, actuator 550 transforms from its martensitic state to its austenitic state to bias actuator assembly 502 toward the closed position 506. More specifically, actuator 550 functions as a compression spring such that when heated, actuator 550 elongates to push against upper surface 558 of platform 546 such that plunger 530 moves toward outlet 528 to restrict airflow through gasper nozzle 500. As such, shaft 522 slides along axis 524 through openings 534 and 542 to position plunger 530 substantially within outlet 528 in the closed position 506 to prevent airflow from gasper nozzle 500.

Similarly, lower actuator 548 is dimensioned such that when actuator 548 is heated by circuit 562 upon a second signal from input device 308, actuator 548 transforms from its martensitic state to its austenitic state to bias actuator assembly 502 toward the open position 504. More specifically, actuator 548 also functions as a compression spring such that when heated, actuator 548 elongates to push against lower surface 554 of platform 546 such that plunger 530 moves away from outlet 528 to allow airflow through gasper nozzle 500. As such, actuator 548 pushes platform 546 along axis 524 to position plunger 530 a distance D from outlet 528 in the open position 504 to facilitate airflow from gasper nozzle 500. It should be understood that the actuation distance may be anywhere between the open position 504 and the closed position 506 based on a desired user comfort level as input into input device 308. It should also be understood that each actuator 548 and 550 could be oppositely trained such that actuators 548 and 550 pull platform 546 to position actuator assembly 502 in the closed position 506 when lower actuator 548 is heated and in the open position 504 when upper actuator 550 is heated.

When lower and upper actuators 548 and 550 reach their austenitic states, circuit 562 terminates current flow and actuators 548 and 550 are intrinsically cooled to return to their martensitic states. However, actuator assembly 502 includes at least one detent 566 that is configured to retain actuator assembly 502 in the desired actuated position. In this implementation, detent 566 is a grooved or ridged surface pattern on an inner surface (not shown) of upper mounting ring opening 542. Alternatively, detent 566 may be a grooved or ridged surface pattern on an inner surface (not shown) of lower mounting ring opening 534. Furthermore, detent 566 may be a grooved or ridged surface pattern on outer surface 552 of shaft 522. Additionally, detent 566 may be a rubber ring positioned between outer surface 552 and at least one of openings 534 and 542. Generally, detent 566 may be any mechanism that provides enough resistance to movement through friction that when one of actuators 548 or 550 is intrinsically returning to its martensitic state after circuit 562 has stopped delivering current, actuator assembly 502 remains in its actuated position as desired by the user. Detent 566 creates enough friction such that actuator assembly 502 remains in its actuated position when current is terminated and actuators begin to cool to their martensitic states. Furthermore, detent 566 generates enough friction to counteract the pressure forces acting on plunger 530 by the air flowing through nozzle 500. However, detent 566 does not create so much friction that actuators 548 and 550 are prevented from subsequently moving actuator assembly 502. That is, detent 566 does not create an amount of friction that cannot be overcome by actuators 548 and 550.

As described above, gasper nozzle 300 (shown in FIG. 3 and FIG. 4) may use any type of actuator to either restrict or allow the flow of air through nozzle 300. The implementations described above use SMA wire actuators for this purpose. However, in implementations where a faster actuation is desired, gasper nozzle 300 may also use a motorized actuator, such as, but not limited to, an electrical motor actuator, an electromagnetic actuator, a piezoelectric actuator, or any combination thereof.

Figure 13:
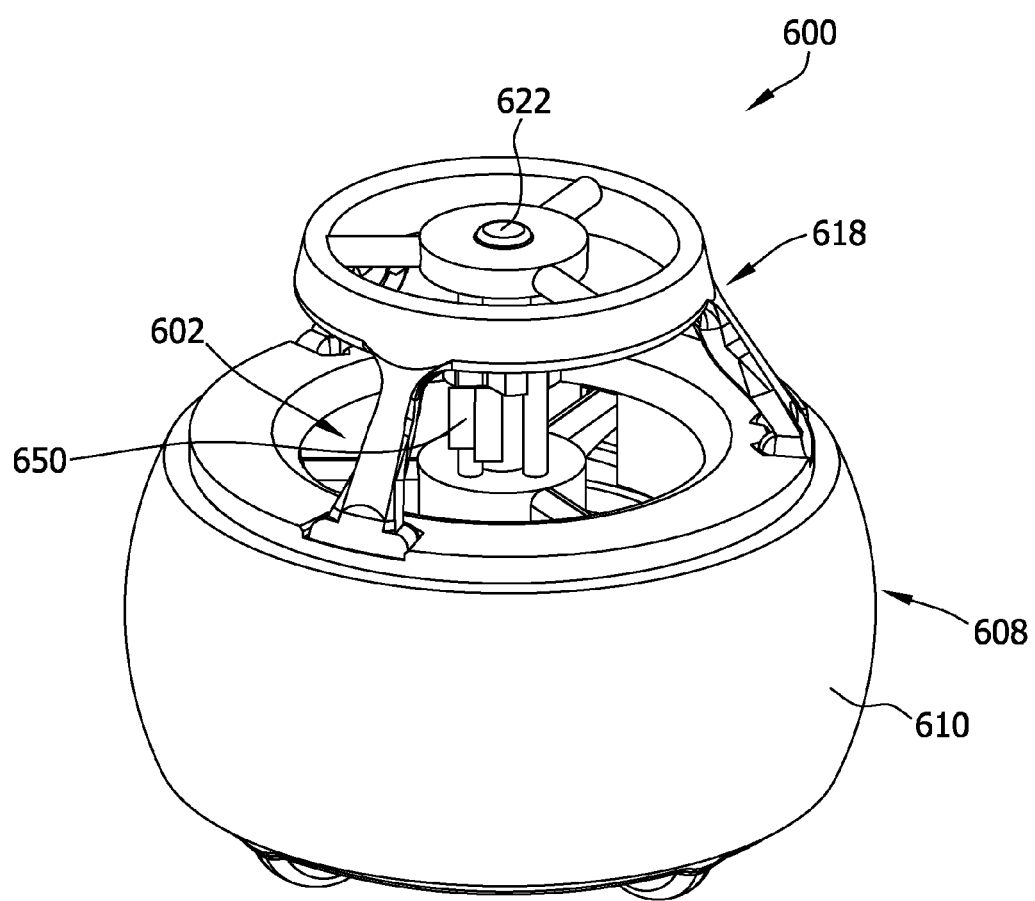
FIG. 13 is a perspective view of another alternative implementation of the gasper nozzle shown in FIG. 1.
Figure 14:
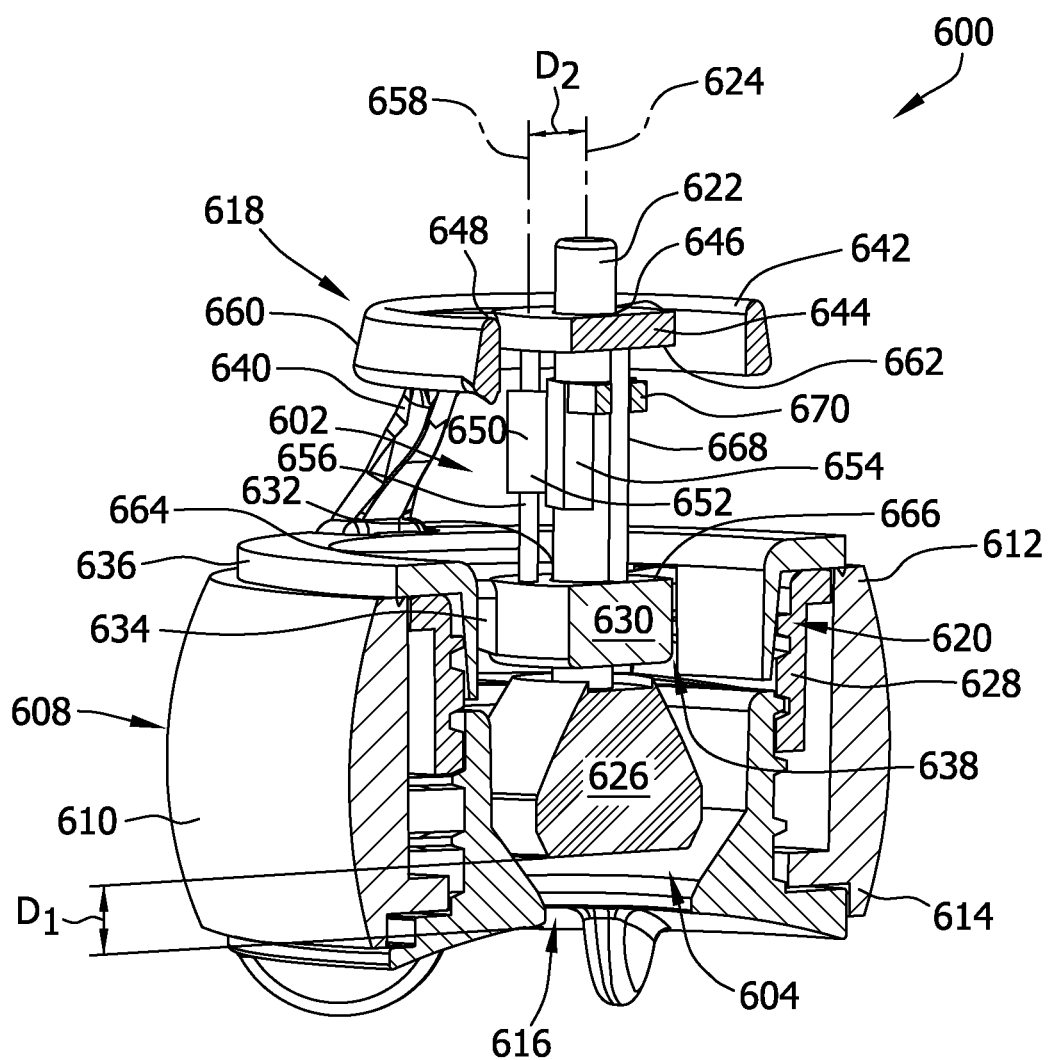
FIG. 14 is a cross sectional view of the gasper nozzle shown in FIG. 13 in an open position.
Figure 15:
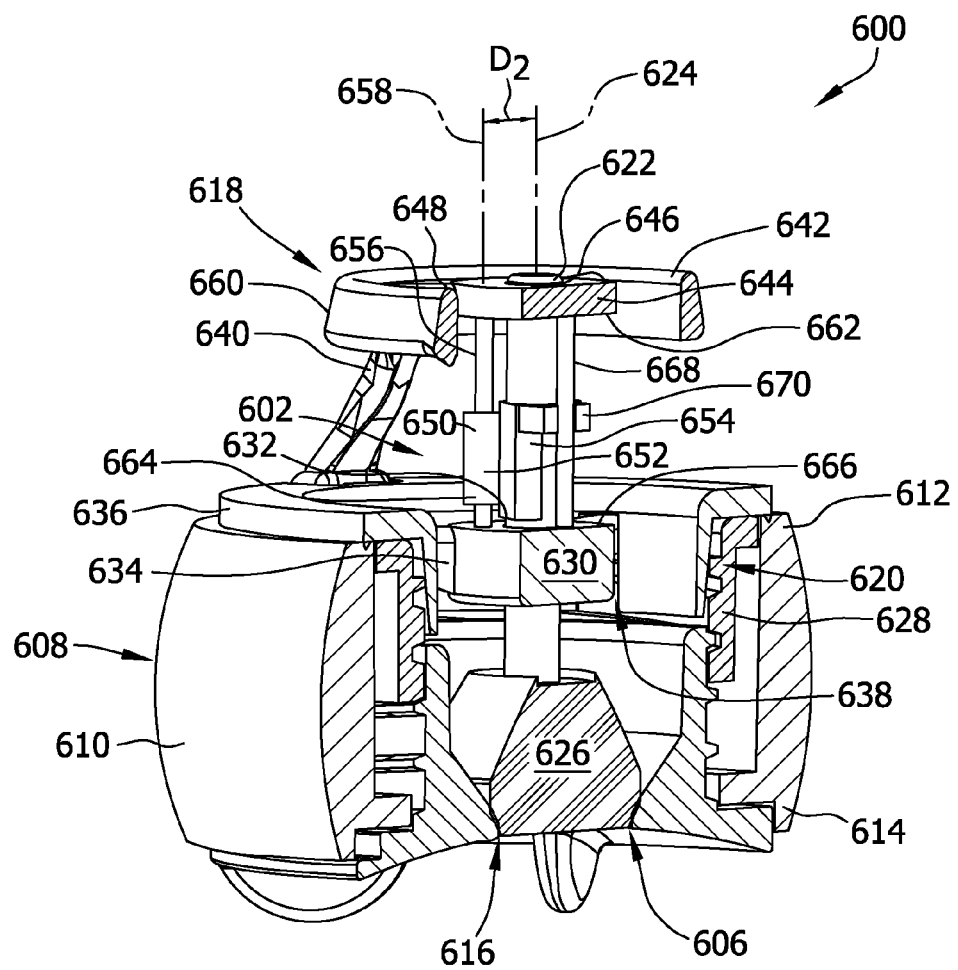
FIG. 15 is a cross sectional view of the gasper nozzle shown in FIG. 13 in a closed position.

FIG. 13 is a perspective view of another implementation of a remotely-controlled gasper nozzle 600 having an offset actuator assembly 602. FIG. 14 is a cross sectional view of gasper nozzle 600 shown in an open position 604. FIG. 15 is a cross sectional view of gasper nozzle 600 shown in a closed position 606. In this implementation, nozzle 600 includes a housing 608 that includes a ball portion 610 having an upper portion 612 and a lower portion 614 that at least partially defines a nozzle outlet 616. Offset actuator assembly 602 of nozzle 600 includes an upper mounting assembly 618, a lower mounting assembly 620 that is positioned proximate ball upper portion 612, and an actuator shaft 622 extending between upper and lower mounting assemblies 618 and 620. Shaft 622 extends along an actuator axis 624 of gasper nozzle 600 and includes a plunger 626 coupled to a lower end of shaft 622 proximate outlet 616. Shaft 622 is configured to be moveable between the open position 604 where plunger 626 is positioned a distance $D_1$ from outlet 616 to allow airflow through gasper nozzle 600, and the closed position 606 where plunger 626 is positioned substantially within outlet 616 to restrict airflow through nozzle 600.

Lower mounting assembly 620 includes a coupling ring 628 coupled to upper portion 612 of ball portion 610. Lower mounting assembly 620 also includes a lower mounting ring 630 that includes an opening 632 that is configured to receive at least a portion of actuator shaft 622 therethrough. A plurality of lower spacing rods 634 are substantially perpendicular to actuator axis 626 and extend between lower mounting ring 630 and coupling ring 628. Lower spacing rods 634 are configured to position lower mounting ring 630 such that opening 632 is coaxial with shaft 622 and actuator axis 624.

Similarly, upper mounting assembly 618 includes a lower coupling ring 636 coupled at upper portion 612 of ball portion 610 proximate coupling ring 628 of lower mounting assembly 620. Lower coupling ring 636 includes a plurality of slots 638 configured to slidably engage a respective one of the plurality of lower spacing rods 634. A plurality of legs 640 extend obliquely with respect to actuator axis 624 from lower coupling ring 636. Legs 640 are configured to couple lower coupling ring 636 to an upper coupling ring 642. Upper mounting assembly 618 also includes an upper mounting ring 644 that includes an opening 646 configured to receive at least a portion of actuator shaft 622 therethrough. Lower and upper mounting rings 630 and 644 are substantially similar in function in that openings 632 and 646 are configured to slidably engage shaft 622 to guide shaft 622 as it moves along axis 624. A plurality of upper spacing rods 648 are substantially perpendicular to actuator axis 624 and extend between upper mounting ring 644 and upper coupling ring 642. Upper spacing rods 648 are configured to position upper mounting ring 644 such that opening 646 is coaxial with shaft 622, axis 624, and lower mounting ring opening 632.

In this implementation, offset actuator assembly 602 further includes a piezoelectric linear motor 650. Alternatively, motor 650 may be any motorized mechanical actuating motor that facilitates operation of offset actuator assembly 602 as described herein. Motor 650 includes a body portion 652 coupled to a motor mounting surface 654 on shaft 622. Motor 650 also includes a motor shaft 656 that defines a motor axis 658, which is parallel to, but offset from, actuator axis 624 by a predetermined distance $D_2$. In this implementation, motor shaft 656 is constrained between upper mounting ring 644 and lower mounting ring 630. More specifically, an upper end 660 of motor shaft 656 is constrained by a lower surface 662 of upper mounting ring 644 and a lower end 664 of motor shaft 656 is constrained by an upper surface 666 of lower mounting ring 630. In such a configuration, ends 660 and 664 are in continuous contact with surfaces 662 and 666 such that actuation of motor 650 causes axial movement of motor body 652 and actuator shaft 622 along axes 658 and 624, respectively.

In this implementation, motor 650 is configured to bias at least a portion of offset actuator assembly 602 to facilitate alternately restricting or allowing airflow through gasper nozzle 600. Motor 650 is configured to bias shaft 622 of offset actuator assembly 602 between the open position 604 and the closed position 606 to control airflow through outlet 616. More specifically, upon receipt of a signal, such as signal 316 (shown in FIG. 4), motor 650 is activated to draw motor shaft 656 through motor body 652 such that upper end 660 pushes against lower surface 662 of upper mounting ring 644 such that actuator shaft 622 moves towards outlet 616 to restrict airflow through gasper nozzle 600. As such, actuator shaft 622 slides along actuator axis 624 through openings 632 and 646 to position plunger 626 substantially within outlet 616 in the closed position 606 to prevent airflow from gasper nozzle 600.

Similarly, upon receipt of signal 316 to allow airflow through nozzle 600, motor 650 is activated to draw motor shaft 656 through motor body 652 such that lower end 664 pushes against upper surface 666 of lower mounting ring 630 such that actuator shaft 622 moves away from outlet 616 to allow airflow through gasper nozzle 600. As such, actuator shaft 622 slides along actuator axis 624 through openings 632 and 646 to position plunger 626 a distance from outlet 616 in the open position 604 to permit airflow through gasper nozzle 600. In this implementation, upon being actuated to a desired position, as determined by the user, motor shaft 656 remains in the desired actuated position without requiring constant actuation by motor 650. As such, offset actuator assembly 602 is able to remain in the desired actuated position as determined by the user without continuous power usage by motor 650 and without reverting to a default position. Alternatively, motor 650 may be coupled to one or more sensors (not shown) that provide a signal representative of the position of motor 650 (i.e., the open position 604 or the closed position 606). Once motor 650 reaches the desired position, the signal can be sent to control board 310 and a return signal to motor 650 with instructions to halt movement.

It should be understood that the actuation distance may be anywhere between the open position 604 and the closed position 606 based on a desired user comfort level as input into input device 308. It should also be understood that motor 650 may oppositely configured such that upper end 660 of motor shaft 656 pulls against upper mounting ring lower surface 662 to bias actuator shaft 622 toward the open position 604 and lower end 664 of motor shaft 656 pulls against lower mounting ring upper surface 666 to bias actuator shaft 622 toward the closed position 606.

In this implementation, offset actuator assembly 602 also includes at least one alignment rod 668 extending between lower mounting ring 630 and upper mounting ring 644. Alignment rod 668 is substantially parallel to axis 624 and 658 and is held in place by an alignment guide 670 coupled to actuator shaft 622. Alignment rod 668 is stationary and is configured to maintain a proper alignment of actuator shaft 622 along actuator axis 624 such that the offset distance $D_2$ between axes 624 and 658 is prevented from causing actuator shaft 622 to travel along any line other than actuator axis 624. Offset actuator assembly 602 may also include a biasing spring (not shown) positioned between upper and lower mounting rings 644 and 630. The biasing spring assists offset actuator assembly 602, and more specifically, motor 650, in returning actuator shaft 622 to the open position. Specifically, the biasing spring counteracts the force of the airflow through gasper nozzle 600 such that motor 650 uses the same amount of force to both open and close offset actuator assembly 602.

Figure 16:
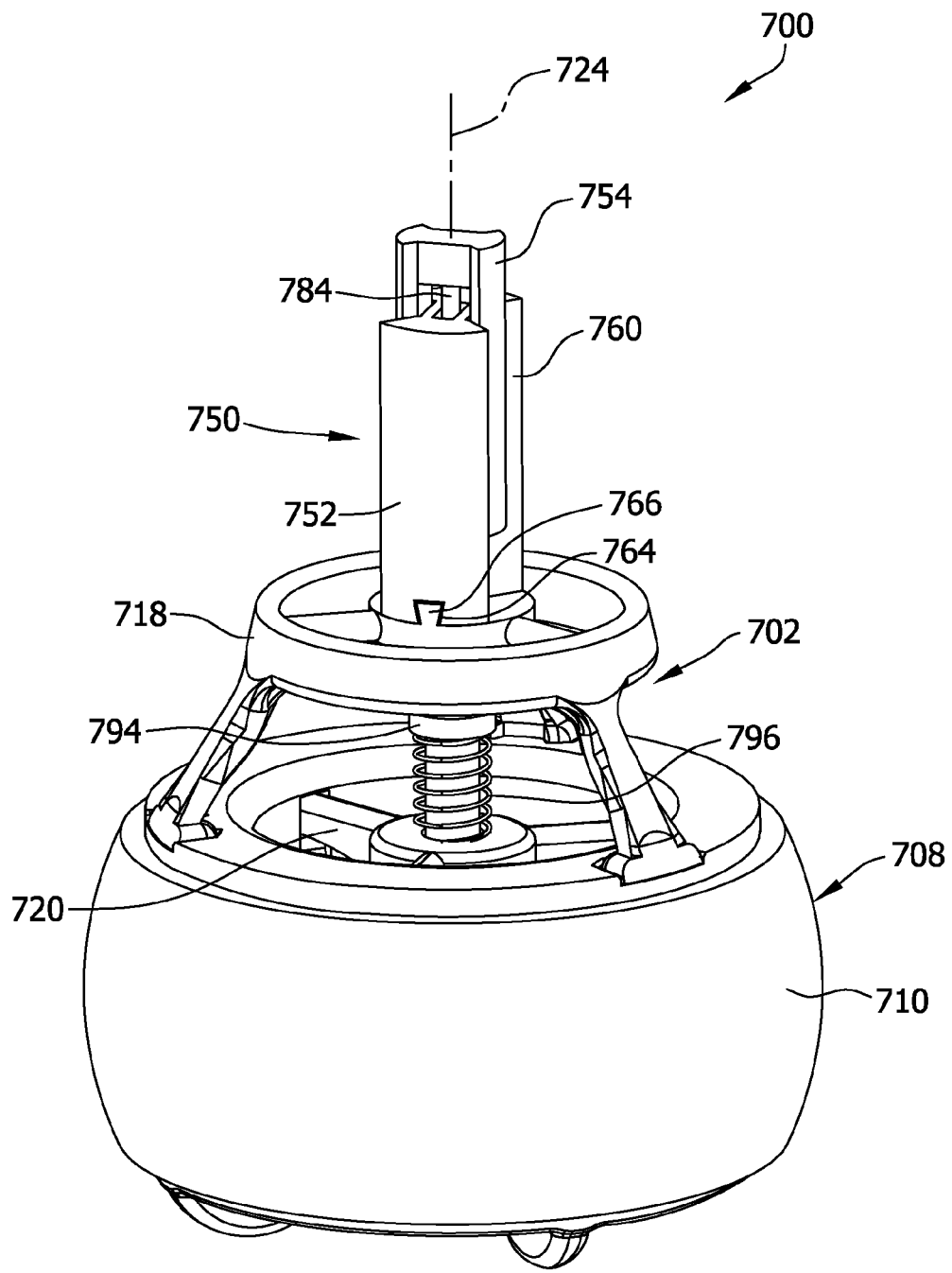
FIG. 16 is a perspective view of yet another alternative implementation of the gasper nozzle shown in FIG. 1.
Figure 17:
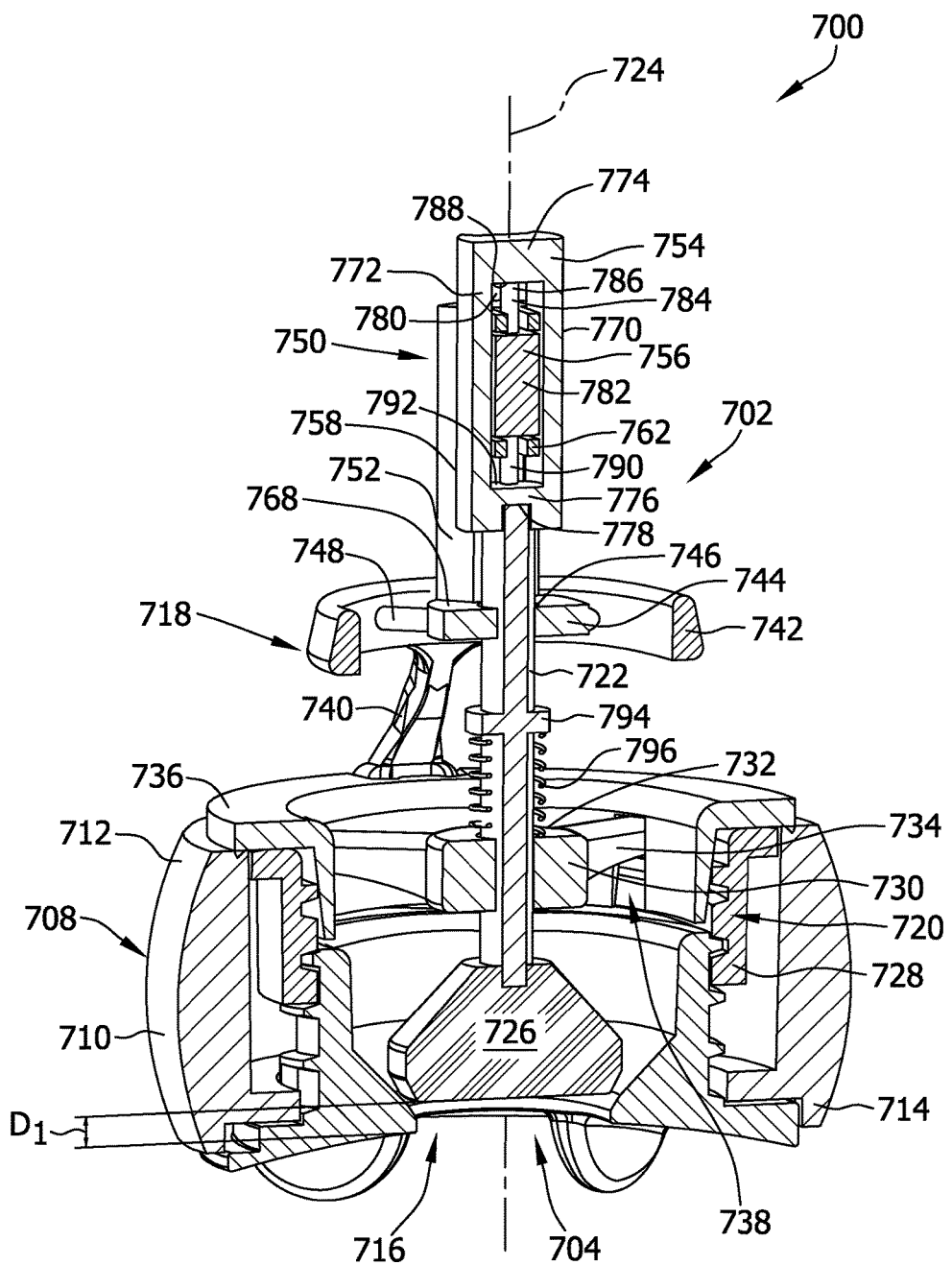
FIG. 17 is a cross sectional view of the gasper nozzle shown in FIG. 16 in an open position.
Figure 18:
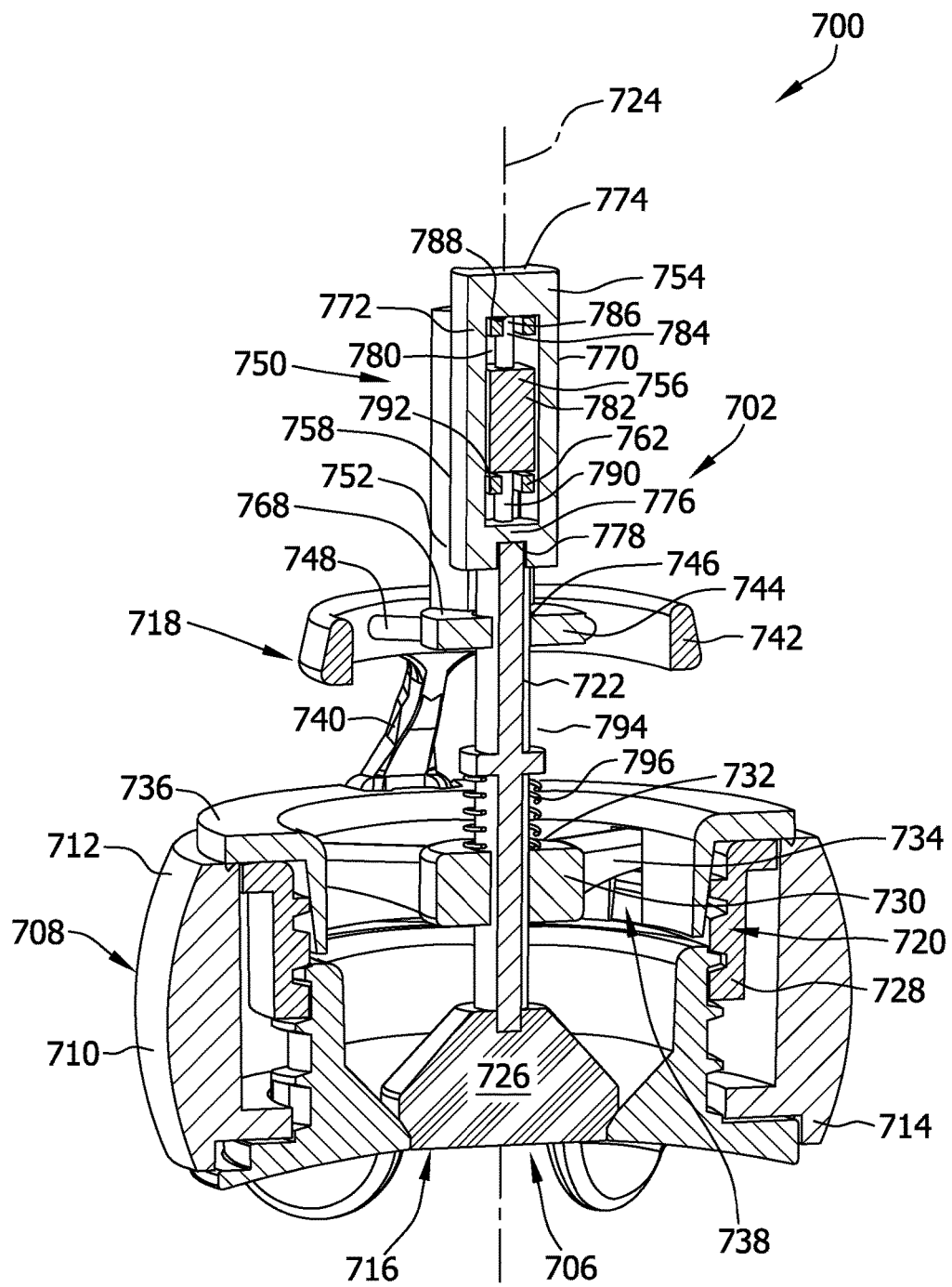
FIG. 18 is a cross sectional view of the gasper nozzle shown in FIG. 16 in a closed position.

FIG. 16 is a perspective view of another implementation of a remotely-controlled gasper nozzle 700 having a coaxial actuator assembly 702. FIG. 17 is a cross sectional view of gasper nozzle 700 shown in an open position 704. FIG. 18 is a cross sectional view of gasper nozzle 700 shown in a closed position 706. In this implementation, nozzle 700 includes a housing 708 that includes a ball portion 710 having an upper portion 712 and a lower portion 714 that at least partially defines a nozzle outlet 716. Coaxial actuator assembly 702 of nozzle 700 includes an upper mounting assembly 718, a lower mounting assembly 720 that is positioned proximate ball upper portion 712, and an actuator shaft 722 extending between upper and lower mounting assemblies 718 and 720. Shaft 722 extends along an actuator axis 724 of gasper nozzle 700 and includes a plunger 726 coupled to a lower end of shaft 722 proximate outlet 716. Shaft 722 is configured to be moveable between the open position 704 where plunger 726 is positioned a distance $D_1$ from outlet 716 to allow airflow through gasper nozzle 700, and the closed position 706 where plunger 726 is positioned substantially within outlet 716 to restrict airflow through nozzle 700.

Lower mounting assembly 720 includes a coupling ring 728 coupled to upper portion 712 of ball portion 710. Lower mounting assembly 720 also includes a lower mounting ring 730 that includes an opening 732 that is configured to receive at least a portion of actuator shaft 722 therethrough. A plurality of lower spacing rods 734 are substantially perpendicular to actuator axis 724 and extend between lower mounting ring 730 and coupling ring 728. Lower spacing rods 734 are configured to position lower mounting ring 730 such that opening 732 is coaxial with shaft 722 and actuator axis 724.

Similarly, upper mounting assembly 718 includes a lower coupling ring 736 coupled at upper portion 712 of ball portion 710 proximate coupling ring 728 of lower mounting assembly 720. Lower coupling ring 736 includes a plurality of slots 738 configured to slidably engage a respective one of the plurality of lower spacing rods 734. A plurality of legs 740 extend obliquely with respect to actuator axis 724 from lower coupling ring 736. Legs 740 are configured to couple lower coupling ring 736 to an upper coupling ring 742. Upper mounting assembly 718 also includes an upper mounting ring 744 that includes an opening 746 configured to receive at least a portion of actuator shaft 722 therethrough. Lower and upper mounting rings 730 and 744 are substantially similar in function in that openings 732 and 746 are configured to slidably engage shaft 722 to guide shaft 722 as it moves along axis 724. A plurality of upper spacing rods 748 are substantially perpendicular to actuator axis 724 and extend between upper mounting ring 744 and upper coupling ring 742. Upper spacing rods 748 are configured to position upper mounting ring 744 such that opening 746 is coaxial with shaft 722, axis 724, and lower mounting ring opening 732.

In the implementation, coaxial actuator assembly 702 also includes a motor mount assembly 750 that extends from an upper end of actuator shaft 722. Motor mount assembly 750 includes a motor holder 752, a motor mount 754, and a motor 756. Motor holder 752 includes a first portion 758 and an opposing second portion 760 that are coupled together via a plurality of coupling arms 762. Furthermore, motor holder 752 is coupled to upper mounting ring 744. More specifically, each portion 758 and 760 of motor holder 752 includes a groove 764 that is configured to slidably engage a respective projection 766 that extends from an upper surface 768 of upper mounting ring 744. Motor holder 752 is configured to remain stationary during actuation of coaxial actuator assembly 702 when shaft 722 moves between the open and closed positions 704 and 706.

Motor mount 754 includes a first portion 770 and a second portion 772 coupled together by an upper spacer 774 and a lower spacer 776. Lower spacer 776 is coupled to an upper end 778 of actuator shaft 722. First and second portions 770 and 772 of motor mount are configured to slidably engage first and second portions 758 and 760 of motor holder 752 such that each portion 770 and 772 of motor mount slides along both portions 758 and 760 of motor holder during actuation of coaxial actuator assembly 702. Portions 770 and 772 and spacers 774 and 776 define a motor mount opening 780 that is configured to receive motor 756 therein. In this implementation, motor 756 is a piezoelectric linear motor. Alternatively, motor 650 may be any motorized mechanical actuating motor that facilitates operation of coaxial actuator assembly 702 as described herein. Motor 756 includes a motor body 782 coupled between coupling arms 762 of motor holder 752 in opening 780 such that coupling arms 762 extend through motor mount opening 780 and are configured to prevent axial movement of motor body 782.

Motor 756 also includes a motor shaft 784 that moves axially along actuator axis 724. In this implementation, motor shaft 784 is constrained between upper spacer 774 and lower spacer 776 of motor mount 754. More specifically, an upper end 786 of motor shaft 784 is constrained by a lower surface 788 of upper spacer 774 and a lower end 790 of motor shaft 784 is constrained by an upper surface 792 of lower spacer 776. In such a configuration, ends 788 and 790 are in continuous contact with surfaces 788 and 790 such that actuation of motor 756 causes axial movement of motor shaft 784, motor mount 754, and actuator shaft 722 along axis 724. As such, motor body 782 is held stationary by coupling arms 762 during actuation of motor shaft 784.

In this implementation, motor 756 is configured to bias at least a portion of coaxial actuator assembly 702 to facilitate alternately restricting or allowing airflow through gasper nozzle 700. Motor 756 is configured to bias actuator shaft 722 of coaxial actuator assembly 702 between the open position 704 and the closed position 706 to control airflow through outlet 716. More specifically, upon receipt of a signal, such as signal 316 (shown in FIG. 4), motor 756 is activated to draw motor shaft 784 through motor body 782 such that lower end 790 pushes against upper surface 792 of lower spacer 776 such that actuator shaft 722 moves towards outlet 716 to restrict airflow through gasper nozzle 700. As such, actuator shaft 722 slides along actuator axis 724 through openings 732 and 746 of lower and upper mounting rings 730 and 744 to position plunger 726 substantially within outlet 716 in the closed position 706 to prevent airflow from gasper nozzle 700.

Similarly, upon receipt of signal 316 to allow airflow through nozzle 700, motor 756 is activated to draw motor shaft 784 through motor body 782 such that upper end 786 pushes against lower surface 788 of upper spacer 774 such that actuator shaft 722 moves away from outlet 716 to allow airflow through gasper nozzle 700. As such, actuator shaft 722 slides along actuator axis 724 through openings 732 and 746 to position plunger 726 a distance $D_1$ from outlet 716 in the open position 704 to permit airflow through gasper nozzle 700. In this implementation, upon being actuated to a desired position, as determined by the user, motor shaft 784 remains in the desired actuated position without requiring constant actuation by motor 756. As such, coaxial actuator assembly 702 is able to remain in the desired actuated position as determined by the user without continuous power usage by motor 756 and without reverting to a default position.

It should be understood that the actuation distance may be anywhere between the open position 704 and the closed position 706 based on a desired user comfort level as input into input device 308. It should also be understood that motor 756 may oppositely configured such that upper end 786 of motor shaft 784 pulls against upper spacer lower surface 788 to bias actuator shaft 722 toward the closed position 706 and lower end 790 of motor shaft 784 pulls lower spacer upper surface 792 to bias actuator shaft 722 toward the open position 704.

In this implementation, actuator shaft 722 also includes a platform 794 and a biasing spring 796 positioned between lower and upper mounting rings 730 and 744. Spring 796 is constrained between platform 794 and lower mounting ring 730. Alternatively, spring 796 may be constrained between platform 794 and upper mounting ring 744. In this implementation, spring 796 is configured to assist coaxial actuator assembly 702, and more specifically, motor 756, in returning actuator shaft 722 to the open position 704. Specifically, biasing spring 796 counteracts the force of the airflow through gasper nozzle 700 such that motor 756 uses the same amount of force to both open and close coaxial actuator assembly 702.

The implementations described herein facilitate providing each user or passenger with individual control over their respective gasper nozzle no matter their limitations. The ability to remotely-control their gasper nozzle ensures that even children, the elderly, and passengers with certain health issues are able to easily determine the volume of air distributed from their nozzle. Furthermore, because nozzle control is available from each passengers seat, the passengers are able control their nozzle at all times, including during times in which they have been asked to refrain from standing, such as during takeoff or landing or during a period of turbulence in an aircraft. Moreover, since every passenger is able to control their own gasper nozzle, aircraft service personnel are not required to assist passengers with their nozzles and may perform other duties that may be related to the safety and comfort of the passengers.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An aircraft comprising:
a plurality of seats;
an input device coupled to each of said plurality of seats; and
a remotely-controlled nozzle positioned proximate each seat of said plurality of seats, said nozzle comprising an actuator assembly comprising:
a first ring;
a second ring spaced a distance from said first ring;
a plurality of legs coupled between said first ring and said second ring;
at least one actuator; and
an actuator shaft extending through said first ring and said second ring, wherein said at least one actuator is configured to translate said actuator shaft linearly through said first ring and said second ring between an open position, to allow airflow through said nozzle, and a closed position, to restrict airflow through said nozzle, in response to a signal received from a respective input device of said input devices, wherein said signal represents a position of said actuator shaft wherein said at least one actuator includes an external compression actuator and an internal tension actuator.

2. The aircraft in accordance with claim 1, wherein said internal tension actuator comprised of a shape memory alloy, wherein said external compression actuator is configured to bias said actuator shaft toward said closed position and said internal tension actuator is configured to bias said actuator shaft toward said open position.

3. The aircraft in accordance with claim 2, wherein said actuator assembly further comprises a current generating circuit configured to apply a current to one of said external compression actuator or said internal tension actuator in response to said signal from a respective one of said input devices.

4. The aircraft in accordance with claim 1, wherein said at least one actuator is a piezoelectric motor coupled to said actuator shaft, said piezoelectric motor comprising a body portion and a motor shaft, wherein said motor shaft is constrained between two fixed surfaces such that activation of said piezoelectric motor in response to said signal causes movement of said body portion and said actuator shaft between said open and closed positions.

5. The aircraft in accordance with claim 1, wherein said actuator assembly further comprises a motor mount assembly comprising:
a motor holder comprising a plurality of coupling arms;
a motor mount coupled at an upper end of said actuator shaft, said motor mount defining an opening; and
a piezoelectric motor coupled within said opening.

6. The aircraft in accordance with claim 5, wherein said piezoelectric motor comprises a body portion and a motor shaft, wherein said plurality of coupling arms extend through said opening and are configured to restrain said body portion such that activation of said piezoelectric motor in response to said signal causes movement of said motor shaft, said motor mount, and said actuator shaft between said open and closed positions.

7. The aircraft in accordance with claim 1, wherein said signal is at least one of a wired and a wireless signal between a respective one of said input devices and said actuator assembly.

8. A remotely-controlled nozzle comprising:
a housing; and
an actuator assembly comprising:
a first ring;
a second ring spaced a distance from said first ring;
a plurality of legs coupled between said first ring and said second ring;
at least one actuator; and
an actuator shaft extending through said first ring and said second ring, wherein said at least one actuator is configured to translate said actuator shaft linearly through said first ring and said second ring between an open position, to allow airflow through said nozzle, and a closed position, to restrict airflow through said nozzle, in response to a signal received from an input device, wherein said signal represents a position of said actuator shaft wherein said at least one actuator includes an external compression actuator and an internal tension actuator.

9. The remotely controlled nozzle in accordance with claim 8, wherein said internal tension actuator comprised of a shape memory alloy, wherein said external compression actuator is configured to bias said actuator shaft toward said closed position and said internal tension actuator is configured to bias said actuator shaft toward said open position.

10. The remotely controlled nozzle in accordance with claim 9, wherein said actuator assembly further comprises a current generating circuit configured to apply a current to one of said external compression actuator or said internal tension actuator in response to said signal from said remote input device.

11. The remotely controlled nozzle in accordance with claim 8, wherein said at least one actuator is a piezoelectric motor coupled to said actuator shaft, said piezoelectric motor comprising a body portion and a motor shaft, wherein said motor shaft is constrained between two fixed surfaces such that activation of said piezoelectric motor in response to said signal causes movement of said body portion and said actuator shaft between said open and closed positions.

12. The remotely controlled nozzle in accordance with claim 8, wherein said actuator assembly further comprises a motor mount assembly comprising:
a motor holder comprising a plurality of coupling arms;
a motor mount coupled at an upper end of said actuator shaft, said motor mount defining an opening; and
a piezoelectric motor coupled within said opening.

13. The remotely controlled nozzle in accordance with claim 12, wherein said piezoelectric motor comprises a body portion and a motor shaft, wherein said plurality of coupling arms extend through said opening and are configured to restrain said body portion such that activation of said piezoelectric motor in response to said signal causes movement of said motor shaft, said motor mount, and said actuator shaft between said open and closed positions.

14. A method of assembling a remotely controlled nozzle, said method comprising:
providing a housing; and
coupling an actuator assembly to the housing, wherein coupling the actuator assembly to the housing comprises:

providing a first ring;

providing a second ring spaced a distance from the first ring;

providing a plurality of legs coupled between the first ring and the second ring;

providing an actuator shaft extending through the first ring and the second ring; and coupling at least one actuator to the actuator shaft such that the at least one actuator is configured to translate the actuator shaft linearly through the first ring and the second ring between an open position, to allow airflow through the nozzle, and a closed position, to restrict airflow through the nozzle, within the housing in response to a signal received from a remote input device, wherein the signal represents a position of the actuator shaft wherein said at least one actuator includes an external compression actuator and an internal tension actuator.

15. The method in accordance with claim 14, wherein coupling the internal tension actuator comprised of a shape memory alloy to the actuator shaft, wherein the external compression actuator is configured to bias the actuator shaft toward the closed position and the internal tension actuator is configured to bias the actuator shaft toward the open position.

16. The method in accordance with claim 14, wherein coupling at least one actuator to the actuator shaft further comprises coupling a piezoelectric motor to the actuator shaft, the piezoelectric motor including a body portion and a motor shaft, wherein the motor shaft is constrained between two fixed surfaces such that activation of the piezoelectric motor in response to the signal causes movement of the body portion and the actuator shaft between the open and closed positions.

17. The method in accordance with claim 14, coupling an actuator assembly to the housing further comprises:

coupling a motor holder proximate the actuator shaft, the motor holder including a plurality of coupling arms;

coupling a motor mount to an upper end of the actuator shaft, wherein the motor mount defines an opening; and coupling a piezoelectric motor within the opening, wherein the piezoelectric motor includes a body portion and a motor shaft, wherein the plurality of coupling arms extend through the opening and are configured to restrain the body portion such that activation of the piezoelectric motor in response to the signal causes movement of the motor shaft, the motor mount, and the actuator shaft between the open and closed positions.

* * * * *

UNITED STATES PATENT AND TRADEMARK OFFICE
CERTIFICATE OF CORRECTION

PATENT NO.      : 10,137,992 B2
APPLICATION NO. : 14/166249
DATED           : November 27, 2018
INVENTOR(S)     : Blom et al.

Page 1 of 1

It is certified that error appears in the above-identified patent and that said Letters Patent is hereby corrected as shown below:

In the Claims

In Column 19, Lines 19-20, Claim 15, delete "wherein coupling the internal tension actuator" and insert therefor -- wherein coupling at least one actuator to the actuator shaft further comprises coupling an external compression actuator and an internal tension actuator --.

Signed and Sealed this
Eighth Day of January, 2019

Andrei Iancu
*Director of the United States Patent and Trademark Office*